(12) United States Patent
Burkhart et al.

(10) Patent No.: US 9,010,374 B2
(45) Date of Patent: Apr. 21, 2015

(54) REGULATOR VALVE WITH INTEGRATED DIRECT ACTING SOLENOID

(75) Inventors: Robert O. Burkhart, Novi, MI (US); Derek Kinch, Ypsilanti, MI (US); John Butwin, Ann Arbor, MI (US); Anthony Koenings, Oakland, MI (US); Hrudaya Mahapatro, Canton, MI (US); Wei Zhuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 820 days.

(21) Appl. No.: 13/192,807

(22) Filed: Jul. 28, 2011

(65) Prior Publication Data
US 2013/0026401 A1 Jan. 31, 2013

(51) Int. Cl.
*F16K 31/06* (2006.01)
*F16H 61/02* (2006.01)

(52) U.S. Cl.
CPC ........ *F16H 61/0251* (2013.01); *F16K 31/0613* (2013.01); *F16H 2061/0253* (2013.01)

(58) Field of Classification Search
CPC .............................. F15B 13/043; F15B 13/044
USPC .......... 137/625.64, 625.65, 625.69; 192/85.63
See application file for complete search history.

(56) References Cited

U.S. PATENT DOCUMENTS

| | | | |
|---|---|---|---|
| 4,100,519 A * | 7/1978 | Neff | 335/262 |
| 4,611,631 A * | 9/1986 | Kosugi et al. | 137/625.65 |
| 5,911,245 A * | 6/1999 | Weber | 137/625.65 |
| 6,408,883 B2* | 6/2002 | Motoki et al. | 137/625.64 |
| 7,523,763 B2* | 4/2009 | Katsuta et al. | 137/625.65 |
| 2006/0027269 A1* | 2/2006 | Neff et al. | 137/625.65 |
| 2006/0065315 A1* | 3/2006 | Neff et al. | 137/625.65 |

* cited by examiner

*Primary Examiner* — Kevin Murphy
(74) *Attorney, Agent, or Firm* — James Dottavio; MacMillan, Sobanski & Todd, LLC

(57) ABSTRACT

A control valve for an automatic transmission includes a valve body including a chamber and a control pressure port, metering edges formed in the valve body at the control pressure port, a reference surface formed in the valve body, a spool displaceable along the chamber, and a solenoid module including a pin for displacing the spool, and located in the chamber by contact with the reference surface.

13 Claims, 3 Drawing Sheets

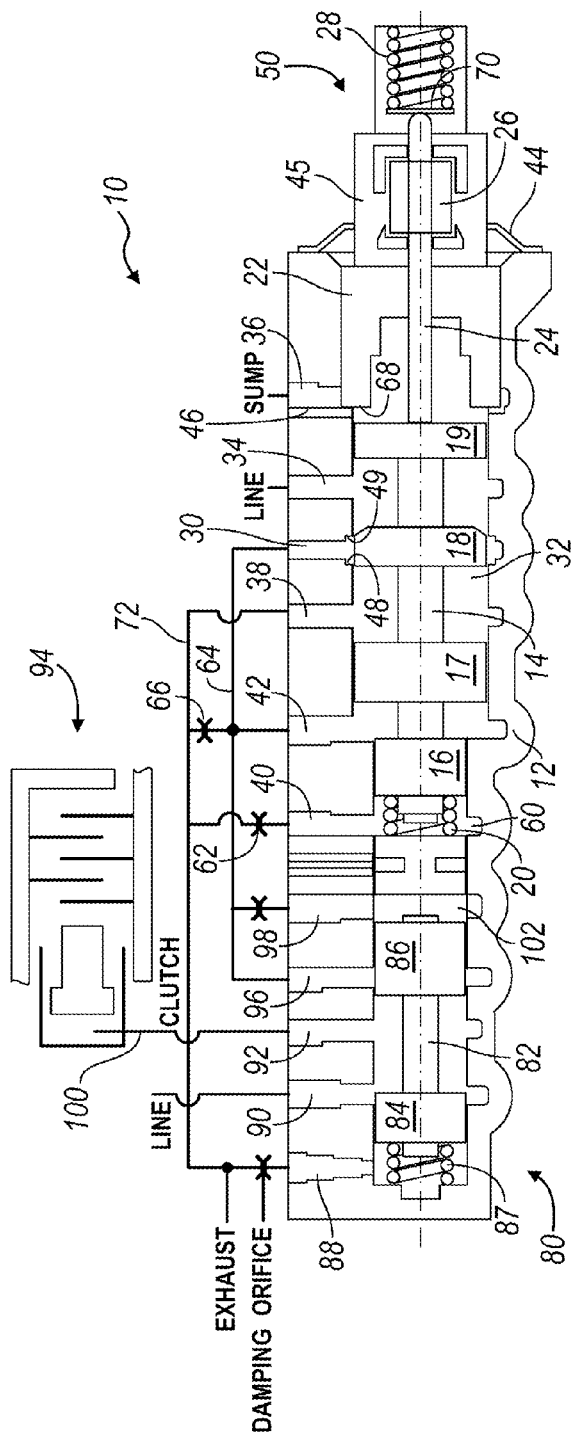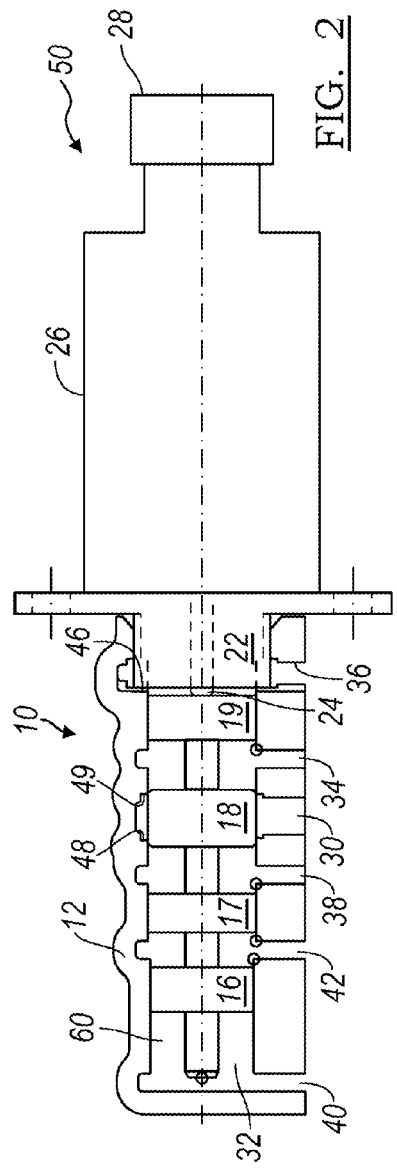

REGULATOR VALVE WITH INTEGRATED DIRECT ACTING SOLENOID

BACKGROUND OF THE INVENTION

1. Field of the Invention

This invention relates generally to a regulator spool valve controlled by a direct acting solenoid located in a machined main control casting of an automatic transmission.

2. Description of the Prior Art

An automatic transmission includes a hydraulic system for regulating fluid pressure and hydraulic fluid flow in various lines connected to components of the transmission. The system includes a regulator spool valve packaged in a main control casting, which is machined at a transmission production plant. The casting, preferably of an aluminum alloy, is usually referred to as a valve body. The components of the system are assembled in the valve body and have transfer functions characterized at the plant.

A solenoid-actuated shift valve controls pressure communicated from the valve to a clutch or brake whose state of engagement and disengagement determines the gear in which the transmission operates. But the dimensional tolerance stack-up in most valve body castings is too large to permit use of a practical integrated electromagnet and achieve required flow and pressure regulation accuracy.

A need exists in the industry for a regulator spool valve formed in a valve body and having an electric solenoid directly integrated into the valve such that the dimensional tolerances are not an obstacle to accuracy of pressure regulation and fluid flow.

SUMMARY OF THE INVENTION

A control valve for an automatic transmission includes a valve body including a chamber and a control pressure port, metering edges in the valve body at the control pressure port, a reference surface in the valve body, a spool displaceable along the chamber, and a solenoid module including a pin for displacing the spool, and located in the chamber by contact with the reference surface.

The control valve allows elimination of the conventional solenoid valve body, while maintaining regulator valve custom tuning at each friction control element without adding solenoid complexity. A hydraulic system that includes the control valve contains fewer components, thereby lowering production and assembly costs. The casting integration provides ability to include a latch function or multiple latch functions to the regulator valve.

The reference structure and machining allows for significantly reduced displacement or travel of the spool, thereby enabling use of a direct acting solenoid to control location of the spool in the valve chamber within cast body.

The integrated hydraulic control portion of the solenoid allows for reduction of space required for solenoid and flow passages, as no additional sleeve, manifold or porting is required.

The same magnetic motor can be used to drive different spool valve configurations within the same valve body casting adapted to differences in the hydraulic circuit. The embodiment shown produces higher pressure as current increases, the direction of application of the electromagnetic force may be reversed to provide high pressure at low current.

Reduced leakage results due to elimination of interface between an electro-hydraulic solenoid sleeve\flange and rest of the control body.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic showing a cross section of a Meter Out-Meter In (MOMI) casting-integrated direct acting solenoid valve with latch valve;

FIG. 2 is a cross section of the casting-integrated direct acting solenoid of FIG. 1;

DESCRIPTION OF THE PREFERRED EMBODIMENT

Figure 3:
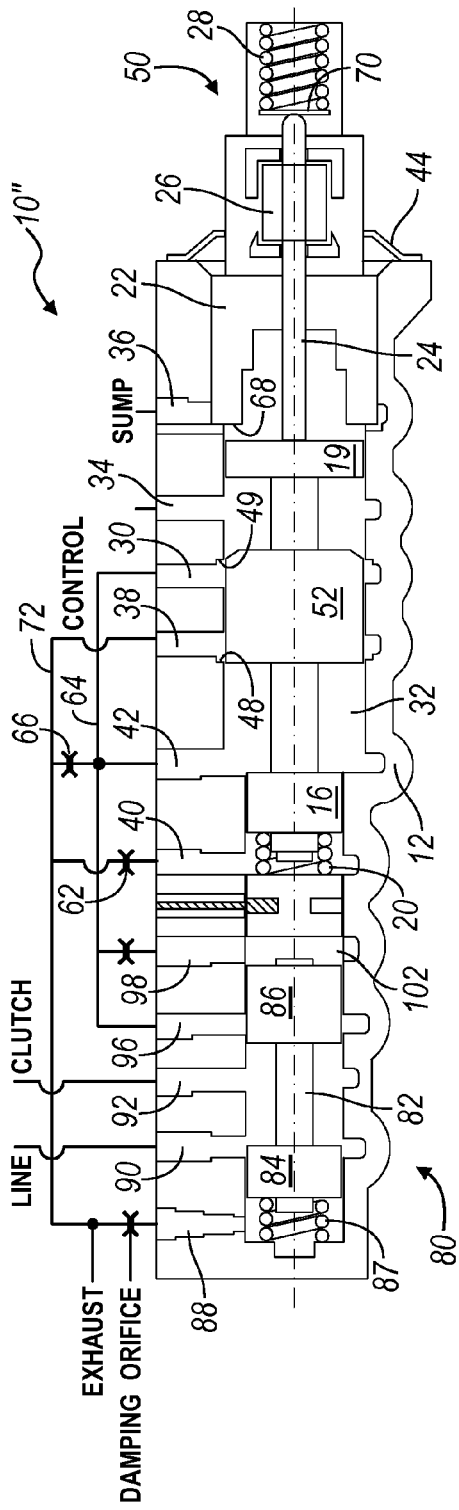
FIG. 3 is a schematic showing a casting-integrated direct acting solenoid valve showing a Meter Out-Meter Out (MOMO) configuration.

The casting-integrated, direct acting solenoid hydraulic valve 10 shown in FIGS. 1 and 2 includes a valve body 12 formed of cast metal, preferably an aluminum alloy. The valve body 12 contains a valve spool 14, formed with lands 16-19; an optional compression spring 20 urging the spool rightward; an armature pin 24 contacting the spool; an electromagnetic solenoid 26, which actuates the pin to move leftward when the solenoid is energized and allows the spool to move rightward when the solenoid is deenergized; and a second optional compression spring 28 biasing the pin leftward.

Preferably spring 20 has a relatively low spring constant to make most use of available force from electromagnetic solenoid 26.

The valve body 12 is formed with control ports 30, 42 through which control pressure communicates with the chamber 32 containing the spool 14; a line pressure port 34, through which line pressure communicates with the chamber; sump port 36, through which hydraulic fluid flows from the chamber to a low pressure sump; and an exhaust ports 38, 40, through which the chamber communicates with a low pressure source.

Adapter 22 or snout is continually held in contact with an installation datum or reference surface 46 formed in sump port 36 by the elastic force produced by a resilient clip 44, which is secured to the outer surface of a housing 45 that encloses the solenoid 26.

A single tool concurrently machines both of the metering edges 48, 49 and the installation datum or reference surface 46 in the valve body. The solenoid module 50 includes adapter 22 or snout, solenoid 26, housing 45 and spring 28.

All edges that requiring precise relative positions are cut in a single operation for improved tolerances and manufacturing efficiency. Metering edges are precision machined rather than cast for improved edge quality, location accuracy, and zero draft. High precision tolerances enable close control of leakage and pressure regulation accuracy. Close tolerances enable flow control with a short stroke solenoid module 50.

In operation, valve 10 regulates control pressure in port 30 and feedback pressure in port 42 by producing a first sum of the force of optional spring 20 and the rightward net force due to control pressure in port 42 acting on the differential areas of lands 16 and 17. Balancing the first sum of forces is a second sum of leftward forces comprising the force of the solenoid-actuated pin 24 and the force of spring 28. As the force of pin 24 increases, valve 10 opens a connection through metering edge 49 between line pressure in port 34 and control pressure in ports 30, 42. As metering edge 49 open, control pressure increases. When control pressure increases sufficiently for the current position of pin 24, the differential feedback control pressure on lands 16, 17 causes the metering edge 49 to close and metering edge 48 to open a connection between control pressure port 30 and to the low pressure exhaust through chamber 32, exhaust port 38 and passage 72.

A single metering control pressure port 30 at spool land 18 (Meter Out-Meter In, as shown in FIG. 1) or a dual metering control pressure ports 30, 38 at spool land 52 (Meter Out-Meter Out, as shown FIG. 3) can be accommodated with no change in tolerances. A clear division of tolerance responsibility is established for the electromagnet and hydraulic manufacturing groups.

In FIG. 2 the diameter of control land 17 is larger than the diameter of land 16 of valve 10. The diameter of land 16 of valve 10 defines a large diameter spool end damper 60 for enhancing stability, permitting use of a relatively large diameter, contamination resistant damper orifice 62. Damper 60 is formed outside of the feedback path 64 for minimum feedback lag and improved stability. The diameter of damper 60 is large relative to the difference in diameter of the lands 16 and 17.

The large diameter of spool land 18 combined with flow notches enables high flow with a short stroke magnet as well as the preferred manufacturing technique.

The valves shown in FIGS. 1-3 enable standard main control (multi-bore including worm trail) configurations while providing magnet interface tolerances.

A control pressure bleed orifice 66 provides for spool position control and stability. Tracking response is improved with no dead-zone to cross. Low frequency hunting across the dead-zone is also prevented.

Tight machining tolerances allow for minimized overlap reducing dead band.

The axial surface 68 of adapter 22 or snout is located in chamber 32 due to contact with reference surface 46 such that, when solenoid 26 is deenergized and spool 14 moves rightward in the chamber, land 19 contacts surface 68 before the armature pin 24 contacts a stop surface 70 in the solenoid module, thereby preventing spring 28 from becoming fully compressed due to contacts among its coils. In this way, the spool end feature provides positive stop for forced over travel protection of the solenoid module 50.

Damping chamber 60 is provided with an oil reservoir using an elevated vent 66 and fed from the control pressure bleed orifice 66.

The casting-integrated, direct acting solenoid configuration 10 (10″ in FIG. 3), includes a latch valve 80 formed in the valve body 12 of cast metal. Valve 80 includes a spool 82, formed with lands 84, 86; a compression spring 87 urging spool 82 rightward; exhaust port 88; line port 90, connected to a source of line pressure whose magnitude is substantially constant; an outlet port 92, through which a clutch or brake 94 of the transmission is actuated; a control port 96 communicating through passage 64 with control pressure ports 30, 42 of valve 10 (10″ in FIG. 3); and a control pressure feedback port 98 also communicating through passage 64 with control pressure ports 30, 42 of valve 10 (10″ in FIG. 3).

In operation, valve 80 supplies actuating pressure through line 100 to the cylinder 102 of a hydraulic servo that actuate the transmission control element 94. When control pressure is relatively low, spring 87 forces spool 82 to the right-hand end of the chamber, thereby closing line port 90, opening control port 96 and communicating fluid at control pressure to the control element 94 through outlet port 92 and line 100. As control pressure increases, spool 82 moves axially leftward along the valve chamber due to a force produced by control pressure in feedback port 98 acting in opposition to the force of spring 87. Land 86 gradually closes port 96, and land 84 maintains line port 90 closed. As control pressure increases further, land 86 closes control port 96, and land 84 opens a connection between line port 90 and the control element 94, thereby latching valve 80 and engaging control element 94 using line pressure, which is typically significantly higher than the maximum regulated pressure of the valve 10 (10″ in FIG. 3). If control pressure increases further after valve 80 is latched, line pressure alone is applied to fully engage the control element 94. After the control element 94 becomes fully engaged, line pressure can be reduced to improve efficiency. The spool 14 of regulating valve 10 is maintained in its regulating position while valve 80 is latched.

Valve 80 is delatched by reducing control pressure, which causes land 84 to close line port 90, and land 86 to reopen a connection between control port 96 and the transmission control element 94 through outlet port 92 and line 100.

Figure 4:
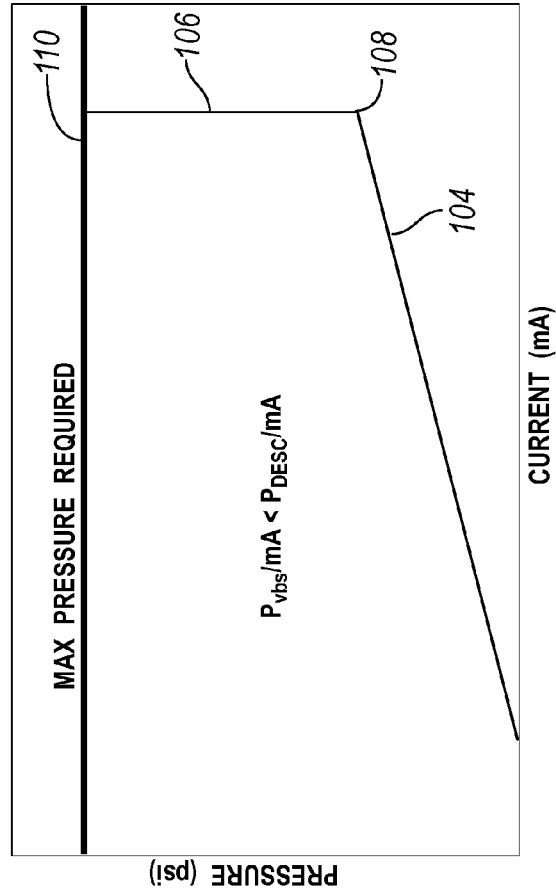
FIG. 4 is a graph showing the variation of outlet pressure in response to current.

FIG. 4 shows the variation of outlet pressure in port 92 in response to current in solenoid 26. The first portion of the relation occurs as control pressure is increased while control port 96 is connected to outlet port 92 and line port is closed. The second portion 106 occurs after point 108 where control port 96 closes and constant line pressure through port 90 opens to outlet port 92 fully engaging the control element at 110.

The feedback chamber 102 of valve 80 is not exhausted when valve 80 is latched, thereby eliminating the possibility of entrapping air in the lines feeding control element 94. Because the feedback chamber 102 of valve 80 is not exhausted when valve 80 is latched, those lines need not be refilled when valve 80 is delatched.

Figure 5:
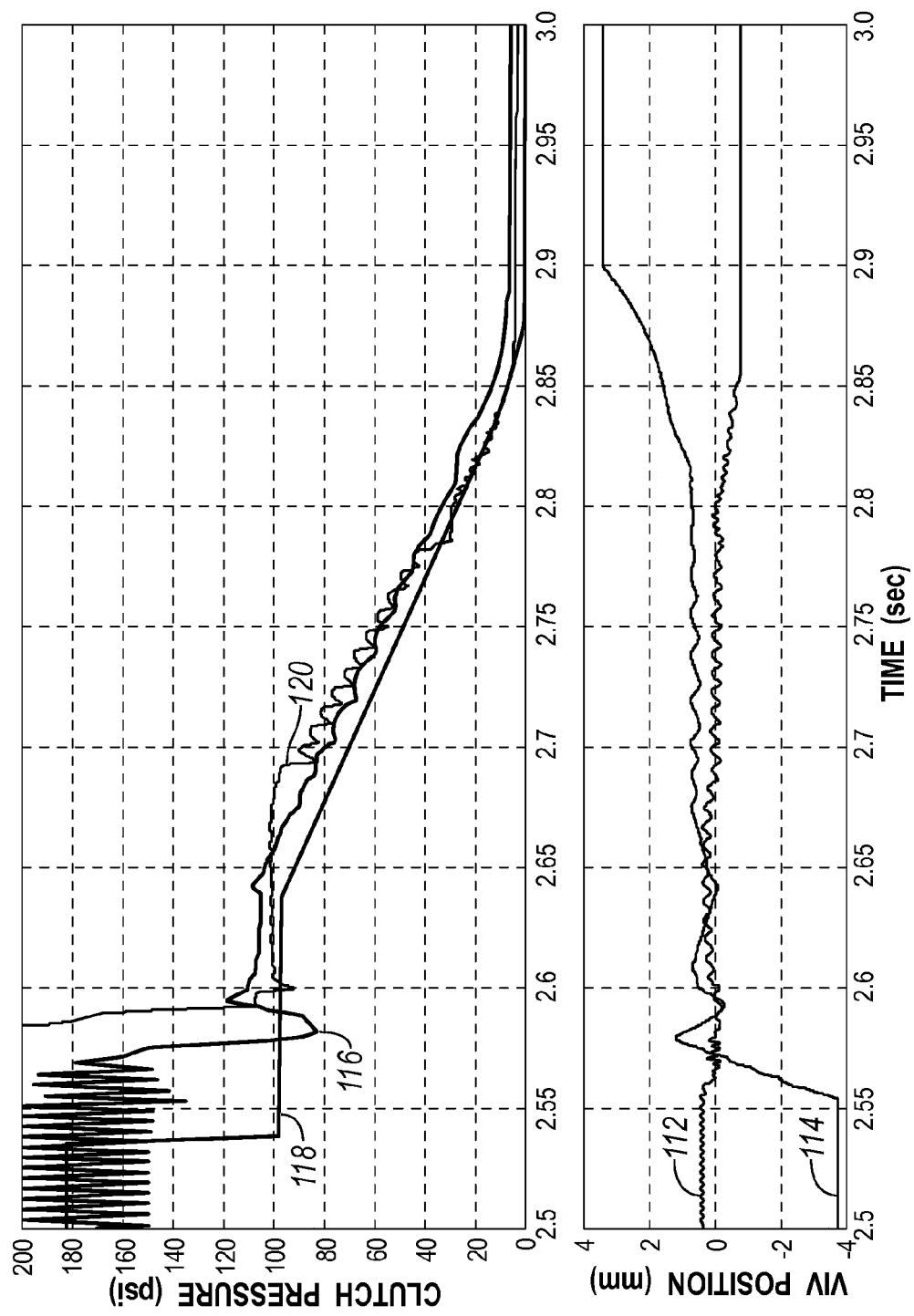
FIG. 5 includes graphs of delatch pressure and regulating spool position while the latch valve is delatched.

The regulator valve 10 and latch valve 80 in combination provide functional advantages in transition states of clutch control by performing the latch transition away from the regulation control. As FIG. 5 shows, upon delatching valve 80, the position 112 of spool 14 of the regulator valve 10 remains in a control metering position because its output pressure controls the actuating event and provides superior transition regulation compared to a VBS-regulator-latch valve system 114.

A VBS-regulator-latch system commonly experiences pressure undershoots 116 past the desired delatch pressure 118, whereas the delatch pressure transient 120 produced by the combination of valves 10, 80 closely tracks the desired delatch pressure 118 with virtually no overshoot.

In accordance with the provisions of the patent statutes, the preferred embodiment has been described. However, it should be noted that the alternate embodiments can be practiced otherwise than as specifically illustrated and described.

The invention claimed is:
1. A control valve comprising:
a cast valve body including an integrally cast chamber and an integrally cast control pressure port;

metering edges machined integrally within the valve body at the control pressure port;
a reference surface machined integrally within the valve body;
a spool displaceable along the chamber;
a solenoid module including a pin for displacing the spool, and located in the chamber by contact with the reference surface;
wherein the solenoid module includes a first stop surface for limiting movement of the pin in the chamber, and a second stop surface able to contact the reference surface; and the spool includes a second land that contacts the second stop surface when the spool moves in the chamber before the pin contacts the first stop surface.

2. The control valve of claim 1, wherein the spool is formed with a land that opens and closes communication between the chamber and the control pressure port across the metering edges.

3. The control valve of claim 1, further comprising:
a spring urging the spool against the pin;
a second spring urging the pin toward the spool; and
a solenoid for producing a magnetic force that opposes a force of the spring and displacing the spool and pin when the solenoid is energized, and allowing the force of the spring to displace the spool and pin when the solenoid is deenergized.

4. The control valve of claim 1, wherein a first of the metering edges is located on a first side of the control pressure port and a second of the metering edges is located on a side of the control pressure port opposite the first metering edge;
further comprising a line pressure port communicating a source of line pressure to the chamber, the land opening a connection between the control pressure port and the line pressure port across the first metering edge.

5. The control valve of claim 1, wherein a first of the metering edges is located on a first side of the control pressure port and a second of the metering edges is located on a side of the control pressure port opposite the first metering edge;
further comprising an exhaust port communicating a low pressure source to the chamber, the land opening a connection between the exhaust port and the control pressure port across the second metering edge.

6. The control valve of claim 1, wherein:
the solenoid module includes an adapter formed with the second stop surface contacting the reference surface.

7. The control valve of claim 6, wherein:
the second stop surface is urged into contact with the reference surface by an elastic force produced by a resilient retainer secured to the solenoid module.

8. The control valve of claim 1, wherein:
the spool includes consecutive, axially-spaced third and fourth lands, the third land having a cross sectional area less than a cross sectional area of the fourth land, the third land defining a damping chamber in the chamber, a cross sectional area of the damping chamber being greater than a difference between said areas of the third and fourth lands.

9. The control valve of claim 8, wherein the damping chamber is in hydraulic communication with the control pressure port.

10. A control valve comprising:
a valve body including a chamber and a control pressure port;
metering edges formed in the valve body at the control pressure port;
a reference surface formed in the valve body;
a spool displaceable along the chamber;
a solenoid module including a pin for displacing the spool, and located in the chamber by contact with the reference surface;
wherein the solenoid module includes a first stop surface for limiting movement of the pin in the chamber, and a second stop surface able to contact the reference surface; and the spool includes a second land that contacts the second stop surface when the spool moves in the chamber before the pin contacts the first stop surface.

11. A control valve comprising:
a valve body including a chamber and a control pressure port;
metering edges formed in the valve body at the control pressure port;
a reference surface formed in the valve body;
a spool displaceable along the chamber;
a solenoid module including a pin for displacing the spool, and located in the chamber by contact with the reference surface;
wherein the solenoid module includes a first stop surface for limiting movement of the pin in the chamber, the solenoid module includes an adapter formed with a second stop surface contacting the reference surface, and the spool includes a second land that contacts the second stop surface when the spool moves in the chamber before the pin contacts the first stop surface.

12. The control valve of claim 11, wherein:
the second stop surface is urged into contact with the reference surface by an elastic force produced by a resilient retainer secured to the solenoid module.

13. A control valve comprising:
a valve body including a chamber and a control pressure port;
metering edges formed in the valve body at the control pressure port;
a reference surface formed in the valve body;
a spool displaceable along the chamber;
a solenoid module including a pin for displacing the spool, and located in the chamber by contact with the reference surface;
wherein the spool includes consecutive, axially-spaced third and fourth lands, the third land having a cross sectional area less than a cross sectional area of the fourth land, the third land defining a damping chamber in the chamber, a cross sectional area of the damping chamber being greater than a difference between said areas of the third and fourth lands; and wherein the damping chamber is in hydraulic communication with the control pressure port.

\* \* \* \* \*